US006502316B2

(12) United States Patent
Campbell et al.

(10) Patent No.: US 6,502,316 B2
(45) Date of Patent: Jan. 7, 2003

(54) VIEWING WINDOW FOR CIRCULAR SAW GUARD

(75) Inventors: David C. Campbell, Bel Air, MD (US); Gale A. Heslop, Carney, MD (US); Lynn E. Lentino, Westminster, MD (US); Michael R. Sell, Bel Air, MD (US)

(73) Assignee: Black & Decker, Inc., Newark, DE (US)

( * ) Notice: Subject to any disclaimer, the term of this patent is extended or adjusted under 35 U.S.C. 154(b) by 0 days.

(21) Appl. No.: 09/864,500

(22) Filed: May 25, 2001

(65) Prior Publication Data

US 2001/0022027 A1 Sep. 20, 2001

Related U.S. Application Data

(63) Continuation of application No. 09/118,118, filed on Jul. 16, 1998, now Pat. No. 6,237,230, which is a continuation of application No. 08/655,803, filed on May 31, 1996, now Pat. No. 5,822,864.

(51) Int. Cl.⁷ ............................................... B23D 45/00
(52) U.S. Cl. ............................ 30/390; 83/478; 74/609
(58) Field of Search .......................... 30/123, 388, 389, 30/390, 391; 83/478, 520, 544, 860, DIG. 1; 451/451, 455, 6; 409/134; 408/24 IG; 74/609

(56) References Cited

U.S. PATENT DOCUMENTS

| 1,037,843 A | 9/1912 | Ackley |
| 1,071,049 A | 8/1913 | Hill |
| 1,099,588 A | 9/1914 | Coates |
| 1,312,651 A | 8/1919 | Walters |
| 1,780,173 A | 11/1930 | Crowe |
| 1,789,357 A | 1/1931 | Ferry |
| 1,830,579 A | 11/1931 | Wappat |
| 2,183,675 A | 12/1939 | Griebling |
| 2,350,247 A | 5/1944 | Newell |
| 2,368,109 A | 1/1945 | Brown |
| 2,491,035 A | 12/1949 | Deacon |
| 2,795,248 A | 6/1957 | Doerner |
| 2,876,810 A | 3/1959 | Peterson et al. |
| D194,736 S | 2/1963 | Godfrey et al. |
| 3,249,134 A | 5/1966 | Vogl et al. |
| 3,373,489 A | 3/1968 | Giles |
| 3,504,716 A | 4/1970 | Bush et al. |
| 3,662,796 A | 5/1972 | Batistelli |

(List continued on next page.)

FOREIGN PATENT DOCUMENTS

| DE | 498325 | 5/1930 |
| DE | 1253443 | 11/1967 |
| DE | 3127274 A1 | 1/1983 |
| DE | 3303734 C2 | 11/1985 |
| DE | 3104340 C2 | 6/1986 |
| DE | 3540625 C2 | 2/1988 |
| DE | 4224094 A1 | 1/1994 |
| DE | 4393469 T1 | 10/1994 |

(List continued on next page.)

OTHER PUBLICATIONS

European Search Report No. EP 97 30 3589, dated Jul. 6, 1998.

(List continued on next page.)

Primary Examiner—Kenneth E. Peterson
(74) Attorney, Agent, or Firm—Shook, Hardy & Bacon L.L.P.

(57) ABSTRACT

A viewing window for covering an aperture in a hand-held circular saw includes an optically transmissive member adapted to be coupled with the guard. The member is movable between a closed position, wherein the member substantially covers the aperture, and the open position, wherein the member at least partially uncovers the aperture, to allow the cleaning of the member. A structure is provided for biasing the member to the closed position.

6 Claims, 4 Drawing Sheets

U.S. PATENT DOCUMENTS

| | | | |
|---|---|---|---|
| 3,805,658 A | | 4/1974 | Scott et al. |
| 3,837,383 A | | 9/1974 | Ko |
| 3,880,032 A | | 4/1975 | Green |
| 3,990,145 A | | 11/1976 | Rubin |
| 4,098,033 A | | 7/1978 | Mann |
| 4,241,505 A | | 12/1980 | Bodycomb, Jr. et al. |
| 4,257,297 A | | 3/1981 | Nidbella |
| 4,322,067 A | | 3/1982 | Masselin et al. |
| 4,450,627 A | | 5/1984 | Morimoto |
| 4,675,999 A | | 6/1987 | Ito et al. |
| 4,875,398 A | | 10/1989 | Taylor et al. |
| 4,892,022 A | * | 1/1990 | Cotton et al. .............. 30/390 |
| 5,046,255 A | | 9/1991 | Lebreux |
| 5,084,972 A | | 2/1992 | Waugh |
| 5,159,759 A | | 11/1992 | Fringer |
| 5,199,343 A | | 4/1993 | O'Banion |
| 5,375,495 A | | 12/1994 | Bosten et al. |
| 5,440,815 A | | 8/1995 | Inkster |
| 5,794,351 A | | 8/1998 | Campbell et al. |
| 5,822,864 A | | 10/1998 | Campbell et al. |
| 5,911,482 A | | 6/1999 | Campbell et al. |
| 6,237,230 B1 | * | 5/2001 | Campbell et al. ............ 30/390 |
| 2002/0002774 A1 | * | 1/2002 | Onose et al. |

FOREIGN PATENT DOCUMENTS

| | | |
|---|---|---|
| JP | 48-4491 | 1/1973 |
| JP | 49-14598 | 2/1974 |
| JP | 50-79094 | 7/1975 |
| JP | 51-34787 | 3/1976 |
| JP | 51-81492 | 6/1976 |
| JP | 51-102891 | 8/1976 |
| JP | 53-135687 | 10/1978 |
| JP | 56-15619 | 2/1981 |
| JP | 56-69402 | 6/1981 |
| JP | 56-69403 | 6/1981 |
| JP | 58-318403 | 3/1993 |
| JP | 5-318403 | 12/1993 |
| WO | WO 85/03473 | 8/1985 |
| WO | WO 92/16340 | 10/1992 |
| WO | WO 94/02296 | 2/1994 |

OTHER PUBLICATIONS

Patent abstract for Patent No. 599,718, issued Oct. 30, 1945.
Patent abstract for Patent No. 674,894, issued May 17, 1950.
Patent abstract for Patent No. 750,429, issued Jun. 17, 1954.
Patent abstract for Patent No. 782,280, issued Nov. 14, 1955.
Patent abstract for Patent No. 791,601, issued May 25, 1956.
Patent abstract for Patent No. 887,003, issued Oct. 26, 1959.
Patent abstract for Patent No. 1,016,387, issued Oct. 1, 1963.
Patent abstract for Patent No. 1,315,720, issued Jan. 12, 1972.

* cited by examiner

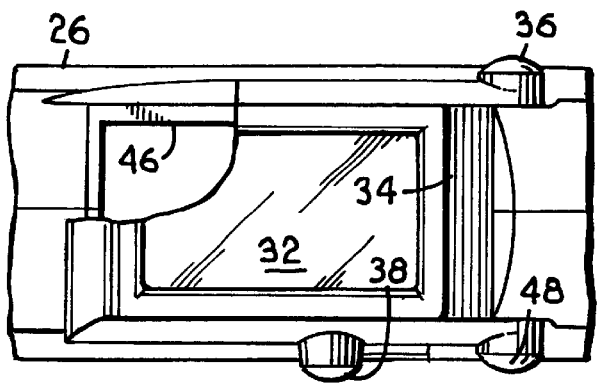
Fig.4.
Fig.5.
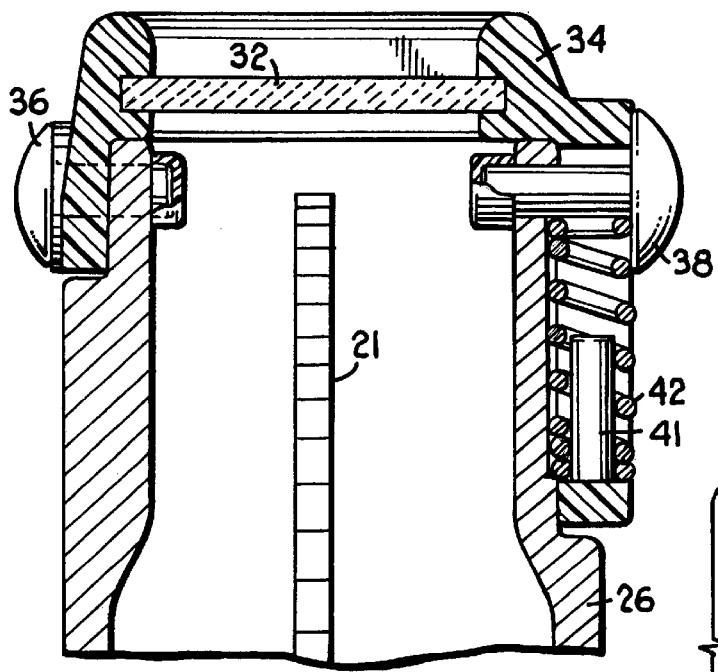
Fig.7.
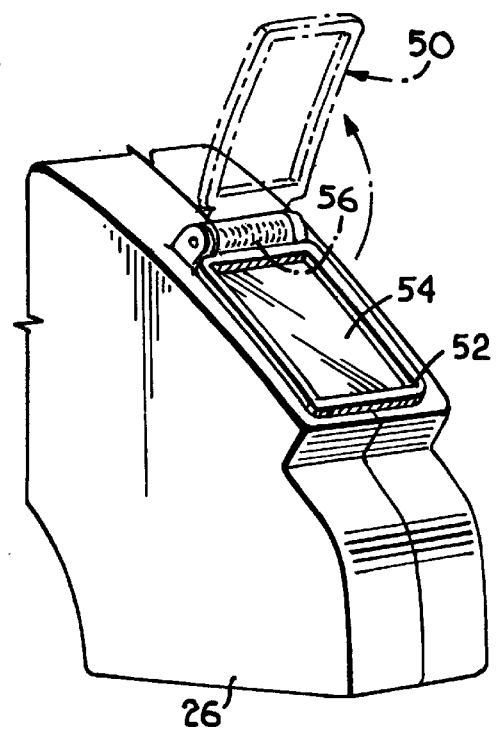

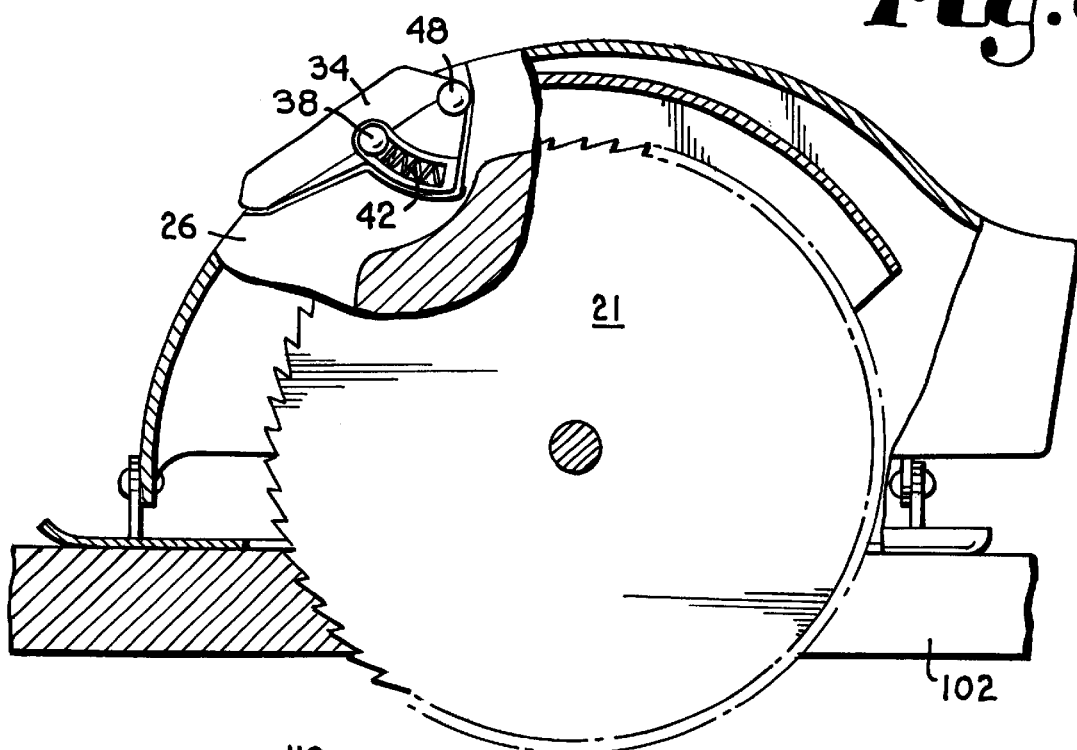
Fig.6.
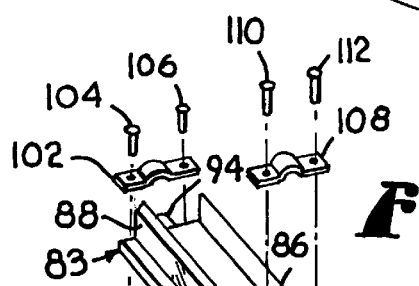
Fig.11.
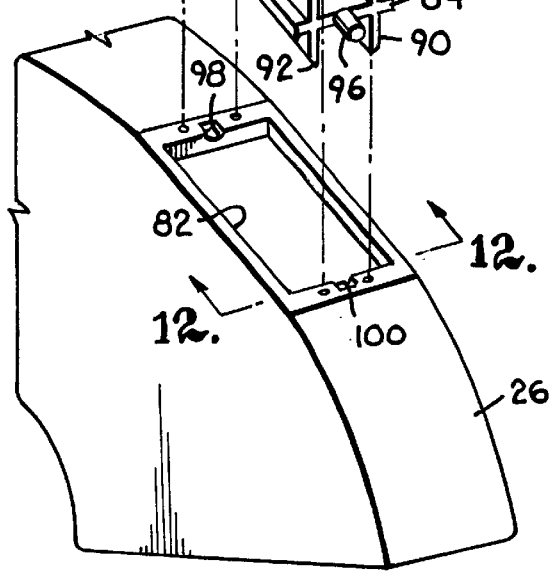
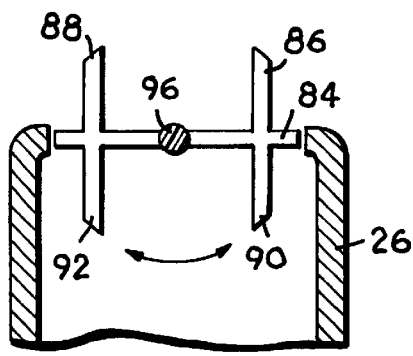
Fig.12.

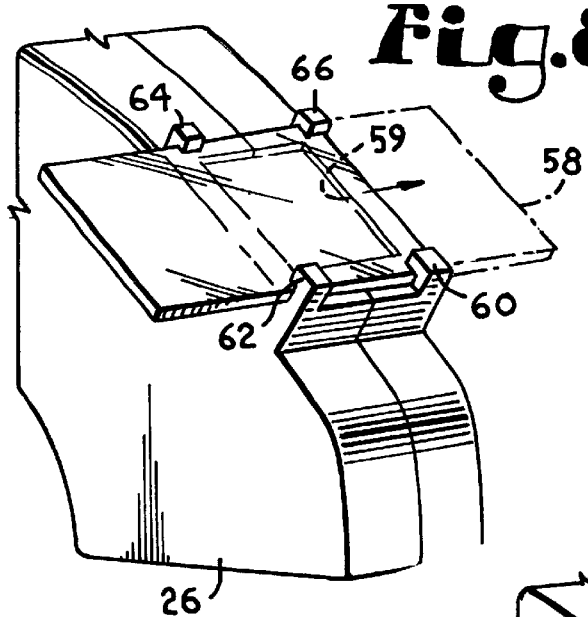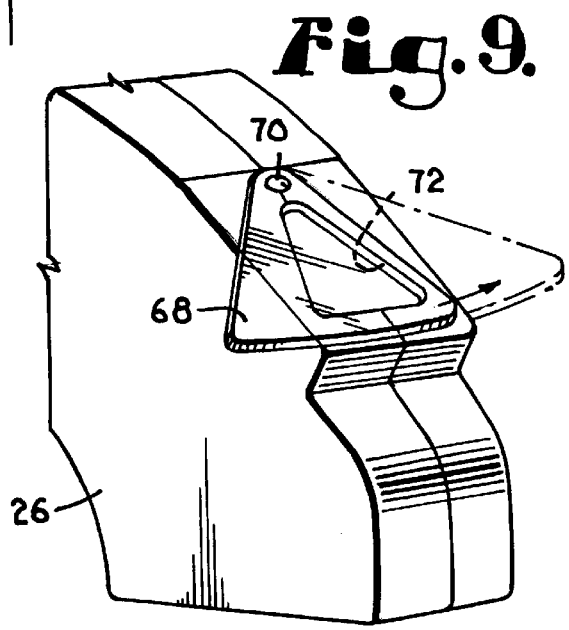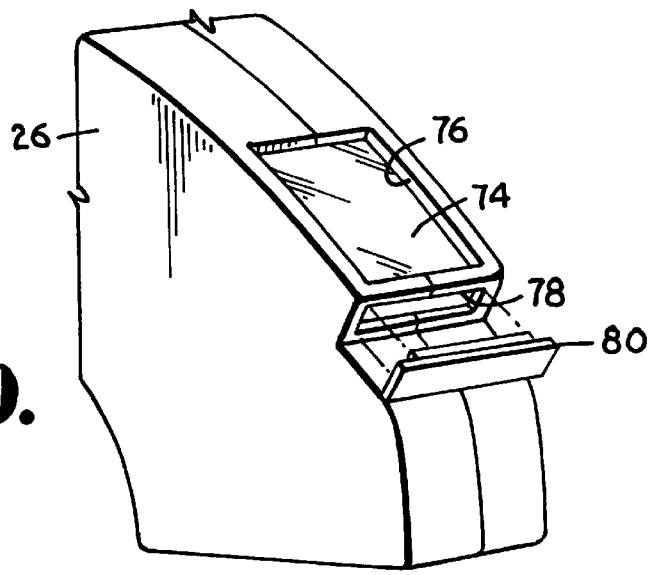

VIEWING WINDOW FOR CIRCULAR SAW GUARD

CROSS REFERENCE TO RELATED APPLICATIONS

This application is a continuation of U.S. application Ser. No. 09/118,118, filed with the U.S. Patent and Trademark Office on Jul. 16, 1998, which issued as U.S. Pat. No. 6,237,230 on May 29, 2001, which was a continuation of U.S. application Ser. No. 08/655,803, filed with the U.S. Patent and Trademark Office on May 31, 1996, which issued as U.S. Pat. No. 5,822,864.

STATEMENT REGARDING FEDERALLY-SPONSORED RESEARCH OR DEVELOPMENT

Not applicable.

BACKGROUND OF THE INVENTION

This invention relates to the field of hand-held power saws and, more particularly, to a viewing window in a circular saw blade guard.

Hand-held power circular saws have been popular woodworking tools for many years. In a typical sawing operation, the user begins by marking or otherwise identifying a desired line along which to saw the material to be cut. The user then guides the saw during cutting, manually aligning the blade with the desired line of cut. Maintaining this alignment manually can be difficult because the typical circular saw has a blade guard that obscures the user's view of the blade at the point of cutting and thus impedes the user's ability to accurately align the blade with the desired cutting line.

To overcome this difficulty, one alternative has been to provide the circular saw with a guide slot. Typically located on the base of the saw, the guide slot is so aligned ahead of the blade in the forward cutting direction to provide a visual indication of the anticipated blade path through the workpiece. During operation, the user typically positions the saw so that the guide slot, and thus the blade, are aligned with the line of cut. This approach can provide a satisfactory cut, unless the saw blade is improperly aligned with the guide slot. A blade is typically oriented at a predesignated location on an arbor driven by the saw motor. Deviations from this orientation can occur causing misalignment between the blade and the guide slot. The guide slot will then incorrectly indicate the blade path, and the user relying on the guide slot will less likely cut the material as desired. Furthermore, since the blade is covered by the saw guard, the user cannot directly monitor the blade travel and, therefore, may not detect the misalignment until substantial cutting has occurred. As a result, the workpiece may be ruined.

To overcome these limitations, another alternative has been to supply the saw guard with a transparent viewing window covering an aperture in the saw guard. Such a window enables direct observation of the saw blade as it enters the workpiece, which in turn enables the user to better maintain a desired cutting path. For example, U.S. Pat. No. 1,830,579 to Wappat provides an observation opening in the side wall of a hand-held circular saw guard. However, the use of a side wall viewing port did not permit the user to saw from a comfortable position behind the saw and at the same time monitor the progress of the blade. Furthermore, to the extent the air currents directed towards the inside surface of the viewing pane were not sufficient to clear the pane of dust, manual clearing of the pane would be required which could more directly expose the saw blade.

A viewing window covering an aperture on the outside circumference of a circular saw blade guard is disclosed in U.S. Pat. No. 4,450,627 to Morimoto. This viewing window is coupled with the saw guard in a variety of ways, including by means of a press fit, a sliding fit or a side hinge. When the viewing window requires cleaning, however, it must either be removed or substantially opened, thereby exposing the saw blade area. After cleaning, if the user neglects to install or close the viewing window, sawing operation without the viewing window in place could occur. The user may not notice the missing viewing window until sawing operations have begun, and cut material could be ejected through the uncovered aperture. The side hinge structure disclosed in this patent allows complete exposure of the aperture in the saw guard.

To overcome these and other limitations in the prior art, an improved viewing window is desirable for a circular saw guard that is easily cleanable without requiring full exposure of the saw guard aperture.

SUMMARY OF THE INVENTION

Accordingly, it is an object of the present invention to provide a clear viewing window in a circular saw guard to cover an aperture in the guard so as to minimize exposure of the aperture during cleaning. A related object is to provide such a window that is easy to operate and inexpensive to manufacture and assemble.

It is a further object of the present invention to provide a clear viewing window for a circular saw guard so biased as to better ensure that the window returns to the closed position after cleaning.

It is a further object of this invention to provide a means for biasing a viewing window in a circular saw guard to the closed position on the outside of the saw guard and in a manner less likely to be affected by material generated during saw operation.

It is a further object of this invention to allow easy cleaning of a viewing window for a circular saw guard while greatly reducing any necessary exposure of the aperture. A related object is to provide a viewing window that is not easily removed from the saw guard and thus less likely to be misplaced.

According to the present invention, the foregoing and other objects are obtained by supplying a circular saw guard with a transparent viewing window whose movement is constrained so as to greatly reduce or eliminate exposure of the aperture during cleaning. In one embodiment, the viewing window is hingedly coupled with the guard to rotate outwardly from the periphery of the guard about an axis parallel to the rotational axis of the blade. In this embodiment, the window is supplied with a means for biasing it to a closed position during use. The window may also be carried in a frame and supplied with a means for limiting its travel to minimize exposure of the aperture during cleaning. In another embodiment of the invention, the viewing window may be larger than the aperture in the saw guard. Tabs forming slots may be provided in the saw guard proximal the aperture to receive a rectangular, planar window that can slide laterally between the use position and the cleaning position. Alternatively, the oversize window may be triangular in shape and pivot about a single point in the periphery of the saw guard. In another embodiment, the window may be approximately the same size as the aperture and be adapted to rotate along its longitudinal axis within the aperture between a use position and a cleaning position. In a further embodiment, the window may be fixedly mounted to the saw guard proximate a second aperture oriented to permit convenient cleaning of the inside surface of the window with a cleaning tool or compressed air introduced through the second aperture. During sawing operations, the second aperture may be covered with a removable plug retained in the second aperture by a press fit.

Additional objects, advantages and novel features of the invention will be set forth in part in the description which follows, and in part will become apparent to those skilled in the art upon an examination of the following, or may be learned by practice of the invention.

BRIEF DESCRIPTION OF THE SEVERAL VIEWS OF THE DRAWINGS

In the accompanying drawings which form a part of this specification and which are to be read in conjunction therewith and in which like reference numerals are used to indicate like parts in the various views:

FIG. 4 is a partial top plan view taken along line 4—4 of FIG. 2 with part of the viewing window being broken away to show particular details of construction.

FIG. 5 is a partial side elevation view taken along line 5—5 of FIG. 2 with part of the viewing window assembly being broken away to show particular details of construction.

FIG. 6 is a partial side elevation view taken along line 6—6 of FIG. 1 showing the viewing window in the closed position and the saw assembly broken away to show particular details of construction.

FIG. 7 is a front perspective view of a second embodiment of the present invention showing the viewing window in the closed position and, in phantom lines, in an open position.

FIG. 8 is a front perspective view of a third embodiment of the present invention showing a viewing window slidably coupled with the circular saw guard.

FIG. 9 is a front perspective view showing a fourth embodiment of the present invention wherein the viewing window pivots about a single point as shown by the indicating directional arrow.

FIG. 10 is a front perspective view of a fifth embodiment of the present invention showing a viewing window coupled with the circular saw guard and a plug removable from a second aperture to access the window for cleaning purposes.

FIG. 11 is a front perspective view of a sixth embodiment of the present invention wherein the viewing window rotates about its longitudinal axis lying on the periphery of the circular saw guard.

FIG. 12 is a partial side elevation view taken along line 12—12 of FIG. 11 showing the viewing window in the closed position.

DETAILED DESCRIPTION OF THE INVENTION

Figure 1:
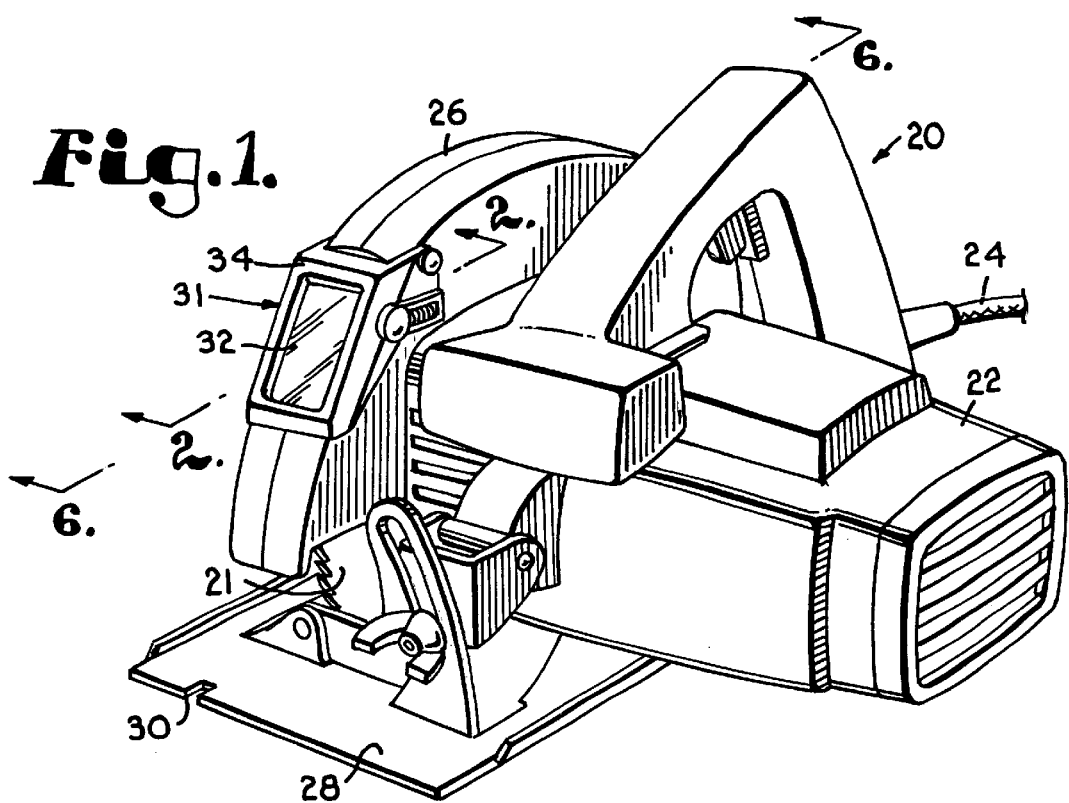
FIG. 1 is a front perspective view showing a viewing window of the present invention in the closed position.

Referring to the drawings in greater detail, a power circular saw is shown designated generally by 20. Saw 20 has a motor 22 operably attached to a circular saw blade 21. A power cord 24 supplies electrical power to motor 22. The upper portion of blade 21 is surrounded by a saw guard 26 secured to motor 22. Saw 20 further has a base 28 with a guide notch 30. Provided in saw guard 26 is an aperture 46 for viewing blade 21 as it travels through a workpiece 102.

A window assembly 31 for covering aperture 46 and embodying the principles of the present invention is shown in FIG. 1. Window assembly 31 is comprised of a frame 34 and an optically transmissive window 32 coupled therewith. Although window 32 is depicted as a generally planar rectangular structure in the drawings, window 32 can be of any suitable shape and curvature. Window assembly 31 is coupled with saw guard 26 by a fastener 36, such as a pin or rivet, that passes through an aperture in frame 34 and through a corresponding aperture in saw guard 26. In this configuration, window assembly 31 is rotatable outwardly from saw guard 26 about an axis parallel to the rotational axis of saw blade 21. A second fastener 48 may be provided that passes through an aperture on the opposite side, and along the rotational axis, of frame 34. Fastener 36 is often sufficient to pivotally support frame 34 and it may not be necessary to have fastener 48. Frame 34 has a flange 39 extending generally downwardly from one side. Flange 39 extends from the side of frame 34 that is opposite fastener 36. Flange 39 is generally perpendicular to window 32 and has an elongated arcuate slot 40 through which a stop pin 38 passes and frictionally couples with an aperture in saw guard 26. Disposed longitudinally between stop pin 38 and the opposite end of slot 40 is a compression spring 42. Slot 40 serves to contain spring 42 and to limit the travel of window assembly 31. As will be understood by those skilled in the art, additional means for retaining spring in 42 may be provided, such as a retaining pin 41 protruding from frame 34 into slot 40 and into one end of spring 42. Saw guard 26 is preferably provided with a recessed area 44 about the edge of aperture 46 adapted to complementarily receive window assembly 31 when in the closed position.

Figure 2:
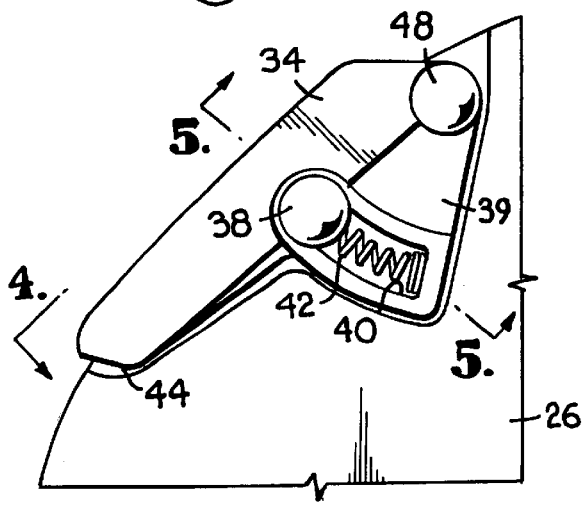
FIG. 2 is a partial side elevation view taken along line 2—2 of FIG. 1 showing the viewing window in the closed position.
Figure 3:
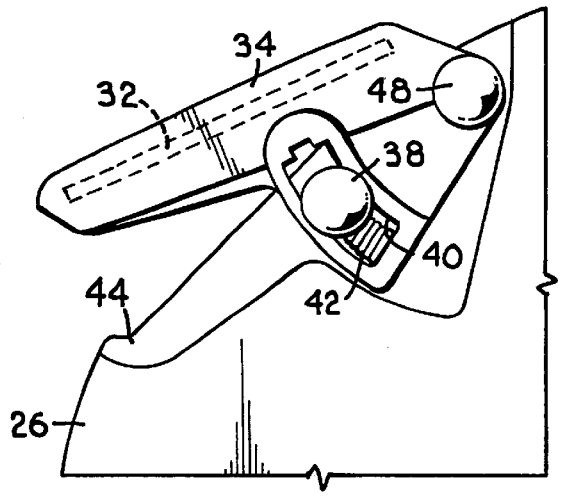
FIG. 3 is a partial side elevation similar to FIG. 2 except showing the viewing window in the open position.

In operation, the viewing window of the present invention is movable between a closed position, as shown in FIG. 2, and an open position, as shown in FIG. 3. In the closed position, it spring 42 is slightly compressed, biasing window assembly 31 to the closed position sufficiently to generally maintain that position. Window assembly 31 can be moved to the open position by applying an external force outwardly from saw guard 26. The window assembly 31 then rotates about its axis to partially expose aperture 46. Opening window assembly 31 causes spring 42 to compress and thereby to exert an increased bias on window assembly 31 to the closed position. Further opening of window assembly 31 is prevented when pin 41 contacts stop pin 38. If pin 41 deflects downwardly due to increased pressure, fully compressed spring 42 will also prevent further opening of the window. In the open position, the inside portion of window 32 may be cleared of dust by a brush or other cleaning instrument. After cleaning operations are complete, window assembly 31 is released and thereupon returns to the closed position through the force exerted by spring 42. Alternatively, window assembly 50, comprised of a frame 52 and a window 54, may be biased to the closed portion using a torsion spring 56 as shown in FIG. 7. As is apparent, window assembly 31 provides easily manufactured and efficient structure to allow easy cleaning of a viewing window.

FIG. 8 shows another window assembly embodying the principles of the present invention. In this embodiment, saw guard 26 is provided with an aperture 59. Located in saw guard 26 proximate the aperture are the tabs 60, 62, 64 and 66 forming a lateral slot. A window 58 is slidably coupled with saw guard 26 by insertion into the slot formed by tabs 60, 62, 64 and 66. Window 58 is sufficiently larger than the aperture to enable the window to slide a sufficient distance for cleaning.

In operation, window 58 slides laterally in the direction of the arrow shown in FIG. 8 to substantially expose the portion of the window 58 that had previously covered aperture 59 as shown in broken lines. This portion of the window may be cleaned with a brush or other appropriate material.

FIG. 9 shows another window assembly embodying the principles of the present invention. In this embodiment, saw guard 26 is provided with an aperture 72 covered by a window 68. A pivot pin 70 or other suitable fastener passes through window 68 and through an aperture in the periphery of saw guard 26. For reasons of mechanical geometry arising from placement of pivot pin 70, both window 68 and aperture 72 are preferably triangular shaped. Window 68 is furthermore larger than aperture 72 and is able to move from side to side. In operation, an external force is applied to window 68 causing it to pivot a desired distance in the direction of the force. Because window 68 is larger in size than aperture 72, the portion of window 68 previously covering the aperture can be exposed for cleaning as shown by the broken lines in FIG. 9.

FIG. 10 shows another window assembly embodying the principles of the present invention. In this embodiment, a first aperture 76 in saw guard 26 is covered by a window 74. Saw guard 26 is further provided with a second aperture 78 proximate and generally perpendicular to aperture 76. Aperture 78 can be covered by a removable plug 80. In operation, plug 80 is removed to enable a cleaning tool or compressed air to be introduced through aperture 78 to dislodge dust from the underside of window 74.

FIG. 11 shows another window assembly embodying the principles of the present invention. In this embodiment, saw guard 26 is provided with an aperture 82. A window assembly 83 is adapted to be coupled with saw guard 26. Window assembly 83 is comprised of a transparent elongated, planar element 84 having planar ribs 86, 88, 90 and 92 disposed longitudinally on, and perpendicular to, planar element 84. Pivot pins 94 and 96 are located on opposite ends of element 84 along its longitudinal center axis. Pin guides 98 and 100 are provided in saw guard 26 to complementally receive pins 94 and 96. A pin retainer 102 is placed over pivot pin 94 to retain its position in pin guide 98. Pin retainer 102 is held in place by fasteners 104 and 106. Similarly, a pin retainer 108 is placed over pivot pin 96 to retain its position in pin guide 100. Pin retainer 108 is held in place by fasteners 110 and 112. In operation, window assembly 83 is shown in a closed position in FIG. 12, whereby element 84 covers aperture 82. Window assembly 83 can be rotated about its longitudinal axis defined by pins 94 and 96 to permit cleaning. During rotation, planar ribs 86, 88, 90 and 92 serve to minimize exposure of aperture 82.

From the foregoing, it will be seen that this invention is one well-adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

We claim:

1. A rotary cutting tool comprising:

a guard having first and second apertures therein, wherein the second aperture is proximate and generally perpendicular to the first aperture; and a window assembly, the window assembly having a window and a plug, wherein the window has upper and lower surfaces and is coupled with the guard such that it covers the first aperture in the guard, whereby the window prevents debris from passing through the first aperture during use of the tool and permits a user to view a cutting surface during use of the tool, and wherein the plug removably covers the second aperture to permit a user to clean the lower surface of the window.

2. The tool of claim 1, wherein the rotary cutting tool includes a rotary cutting member having a peripheral edge and a radius, wherein the window is generally planar in nature and is perpendicular to the radius of the cutting member.

3. A hand-held circular saw guard comprising:

a housing having first and second apertures therein, the second aperture being proximate and generally perpendicular to the first aperture;

a viewing window coupled with the housing and covering the first aperture, the window having upper and lower surfaces; and a plug removably received in the second aperture to permit cleaning of the viewing window, wherein the removal of the plug from the second aperture permits a user to access the lower surface of the window for cleaning.

4. A hand-held circular saw guard comprising:

a housing having first and second generally parallel sidewalls connected by a top wall, wherein the top wall has first and second apertures therein, and wherein the second aperture is proximate the first aperture;

a viewing window coupled with the housing and covering the first aperture, the window having upper and lower surfaces; and a plug removably received in the second aperture to permit cleaning of the viewing window, wherein the removal of the plug from the second aperture permits a user to access the lower surface of the window through the second aperture for cleaning.

5. The guard of claim 4, wherein the second aperture is generally perpendicular to the first aperture.

6. The guard of claim 5, wherein the window is mounted on an underneath side of the top wall.

* * * * *